(12) United States Patent
Kado et al.

(10) Patent No.: US 6,514,469 B1
(45) Date of Patent: Feb. 4, 2003

(54) RUGGEDIZED METHODS AND SYSTEMS FOR PROCESSING HAZARDOUS WASTE

(76) Inventors: Yuji Kado, 12232 Lincoln Lake Way, Apt. 1201, Fairfax, VA (US) 22030; John F. Kantak, 8207 Collingwood Ct., Alexandria, VA (US) 22308; Jay Ramamurthi, 1132 Stuart Hills Way, Herndon, VA (US) 20170; Mark E. Vetter, 1504 Pernell Ct., Bowie, MD (US) 20716

( * ) Notice: Subject to any disclaimer, the term of this patent is extended or adjusted under 35 U.S.C. 154(b) by 0 days.

(21) Appl. No.: 09/667,674

(22) Filed: Sep. 22, 2000

(51) Int. Cl.[7] ................................................ B01J 19/08
(52) U.S. Cl. .................... 422/186.21; 110/250; 110/215
(58) Field of Search ...................... 422/186.21; 110/250, 110/215

(56) References Cited

U.S. PATENT DOCUMENTS

| | | |
|---|---|---|
| 3,779,182 A | 12/1973 | Camacho et al. |
| 3,841,239 A | 10/1974 | Nakamura et al. |
| 4,181,504 A | 1/1980 | Camacho |
| 4,438,706 A | 3/1984 | Boday et al. |
| 4,479,443 A | 10/1984 | Faldt et al. |
| 4,508,040 A | 4/1985 | Santen et al. |
| 4,615,285 A | 10/1986 | Bentell et al. |
| 4,644,877 A * | 2/1987 | Barton et al. .......... 422/186.23 |
| 4,770,109 A | 9/1988 | Schlienger |
| 4,831,944 A | 5/1989 | Durand et al. |
| 4,980,092 A | 12/1990 | Pineau et al. |
| 4,989,522 A | 2/1991 | Cline et al. |
| 4,998,486 A | 3/1991 | Dighe et al. |
| 5,090,340 A | 2/1992 | Burgess |
| 5,095,828 A | 3/1992 | Holden et al. |
| 5,127,347 A | 7/1992 | Cheetham |
| 5,134,946 A | 8/1992 | Poovey |
| 5,143,000 A | 9/1992 | Camacho |
| 5,280,757 A | 1/1994 | Carter et al. |
| 5,319,176 A | 6/1994 | Alvi et al. |
| 5,534,659 A | 7/1996 | Springer et al. |
| 5,615,627 A * | 4/1997 | Marr ........................... 110/346 |
| 6,267,931 B1 * | 7/2001 | Nickens et al. ............. 422/171 |

* cited by examiner

*Primary Examiner*—Kishor Mayekar
(74) *Attorney, Agent, or Firm*—Womble Carlyle Sandridge & Rice, PLLC (57) ABSTRACT

Hazardous waste can be processed using novel, ruggedized and flexible methods and systems. Such novel methods and systems comprise a survivable processing vessel designed to withstand shock, vibration and stresses encountered when, for example, the system is moved from one hazardous waste site to another and a carbon conversion unit which essentially prevents the release of pollutants into the surrounding environment by substantially reducing the amount generated. In addition, such methods and systems provide the ability to switch a supply of gas to dual plasma arc torches from air to an inert gas or vice-versa in order to maintain a critical oxygen ratio under a certain threshold as different types of waste are destroyed. The lack of water at certain sites is overcome by recirculating water and by using a closed-loop cooling system. Similarly, the lack of certain fuels to run the system is overcome by utilizing a single fuel.

30 Claims, 4 Drawing Sheets

RUGGEDIZED METHODS AND SYSTEMS FOR PROCESSING HAZARDOUS WASTE

This invention was made with Government support under contract #N00 140-92-C-BC49 awarded by the United States Navy. The Government has certain rights in the invention.

BACKGROUND OF THE INVENTION

For years, people have attempted to solve the problems associated with the destruction, processing, and handling (hereafter collectively referred to as "processing") of hazardous and toxic waste (hereafter collectively referred to as "hazardous waste"). To date, the primary means of processing hazardous waste is to burn such waste in an incinerator. Incinerators, however, have their drawbacks. First, incinerators are not capable of processing certain types of hazardous waste such as polychlorinated biphenyls, hydrogen fluoride, bromines, complex organics, and pesticides. Second, incinerating some hazardous waste results in the generation of yet other hazardous byproducts or pollutants which take the form of a liquid, solid, or gas, such as heavy metals, dioxins and furans which are known to cause cancer in humans. Third, it has been difficult for municipalities and counties to identify acceptable locations within their communities to locate an incinerator, because few, if any, communities find it desirable to locate an incinerator in their own "backyard." Fourth, it is sometimes assumed that hazardous waste can be brought to an incinerator for processing. However, some hazardous waste is so dangerous it cannot be moved even a short distance to an incinerator. In yet other instances, hazardous waste can be moved but, given a choice, it should not be moved. Moving waste, even a short distance, raises the possibility that a spill may occur. Further, burning waste in an incinerator has other drawbacks. Most hazardous waste sites which use incinerators also require special landfills where hazardous byproducts (e.g., fly and bottom ash) from the incinerator must be buried and continually maintained in accordance with federal, state and local government regulations. Operating such a landfill is complicated, risky and costly.

Existing systems have attempted to provide alternatives to incineration. One such system is disclosed in U.S. Pat. No. 5,534,659 to Springer, et al., ("Springer") for example. Co-pending and commonly assigned U.S. patent application No. 09/667,673 entitled "Method And System For Safely Processing Hazardous Waste" (hereafter referred to as "co-pending application") addresses some of the shortcomings and inadequacies of existing systems. Co-pending U.S. Patent Application No. entitled "Methods And Systems For Safely Processing Hazardous Waste" (hereafter referred to as "co-pending application") addresses some of the shortcomings and inadequacies of existing systems.

Springer deals with a fixed waste processing system. By "fixed" system is meant a system which is not designed or constructed to be frequently moved from one location or position to another. Said another way, fixed systems are not designed or constructed to be rugged or mobile. Rather, existing fixed systems are constructed at, or near, the location of the hazardous waste which needs to be processed. In some instances, fixed systems can be built in pieces and then transported to a hazardous waste site. Thereafter, the pieces are put together to form one fixed system. Some fixed systems can also be broken down into their original pieces and transported to a new location. However, a fixed system cannot be frequently moved to a different location or position without risking damage to the system due to, among other things, vibrations and shocks encountered while the system is being moved. In sum, because fixed systems are not designed to be rugged or mobile, they would not survive being repeatedly moved from one location or position to another.

In reality, existing systems are designed to destroy hazardous waste at a certain location ("existing" means systems, methods or devices other than those discovered by the present inventors). Each location will typically store one principle type of hazardous waste, such as ammunition, medical waste or nuclear waste. It should be understood that the term one type of hazardous waste does not mean that the waste cannot be composed of more than one constituent or composition. To the contrary, medical waste may contain many different types of constituents such as cardboard, plastics, glass and metal, However, it would be rare for one site to contain medical waste and ammunition or nuclear waste, for example.

Before going further, it should be understood that by "hazardous waste site" or "waste site" is meant the location of hazardous waste. This location may be the same location where the waste is generated or a different location, for example, where the waste is stored.

Typically, existing systems are not designed to destroy different types of hazardous waste. Therefore, it is impractical to move an existing system from one hazardous waste site containing one type of hazardous waste (e.g., asbestos) to a second hazardous waste site containing a second type of waste (e.g., medical waste). On the other hand, there is a need to develop ruggedized or mobile waste processing systems which are capable of being moved from one site to another and flexible enough to destroy more than one type of hazardous waste.

Existing systems are usually designed to take advantage of the utilities (e.g., water and power) present at a hazardous waste site. For example, existing systems are usually designed under the assumption that some hazardous waste locations have a ready supply of water and access to electrical power. Water is used in waste processing systems to help eliminate undesirable pollutants (e.g., particulate and acid gasses) generated when hazardous waste is processed as well as for cooling purposes. Problems occur when this assumption proves incorrect.

Accordingly, it is desirable to provide ruggedized methods and systems for processing hazardous waste.

It is also desirable to provide ruggedized methods and systems for processing hazardous waste which are flexible enough to process more than one type of hazardous waste.

It is yet further desirable to provide ruggedized methods and systems for processing hazardous waste which are capable of operating at hazardous waste sites which do not have sufficient water and/or power.

Other desires will become apparent to those skilled in the art from the following description taken in conjunction with the drawings and claims.

SUMMARY OF THE INVENTION

In accordance with the present invention there are provided ruggedized and flexible methods and systems for processing hazardous waste. Such methods and systems comprise a survivable waste processing vessel. One example of a survivable vessel comprises a self-sealing vessel adapted to substantially minimize stress (e.g., vibration plus road shock). Survivability of the vessel is further increased because the vessel comprises a cylindrical lower portion and a Roman-arch-shaped upper portion. Flexibility of the vessel is increased by adapting it to receive all three forms of waste; solids, liquids and gasses.

Further, such methods and systems can be outfitted with a switchable torch control unit adapted to rapidly switch a torch gas between air and an inert gas, such as nitrogen, from a gas supply to two plasma arc torches. This helps to control a critical oxygen to product gas ratio. Maintaining the ratio under a certain threshold is critical to ensure the safe operation of systems which are processing multiple types of hazardous waste.

The torches may comprise either non-transfer or transfer arc torches so as to more efficiently destroy both organic and inorganic wastes.

To maximize the life of an electrode within each torch, the switchable control unit is further adapted to rapidly control power to each torch independently over a range of 50% power to full power.

Problems associated with unavailable water supplies are solved by providing each system with a product gas cleaning unit which is adapted to, among other things, substantially eliminate a waste water slip stream by recirculating water within the system. Recirculation helps to substantially reduce the amount of water required by the system and eliminate a waste water slip stream.

The present invention also envisions an eductor adapted to maximize conversion of free carbon particulate byproducts so as to reduce carbon pollutants, by, among other things, injecting an oxidant into an extremely turbulent region.

Together, or individually, components of ruggedized systems envisioned by the present invention may be placed on one or more platforms, such as flat-bed trailers, each adapted to minimize road shock and vibration in order to allow the system to be moved from one location or position to another. To minimize shock and vibration each platform comprises a unibody construction and air ride suspension. Locating components of a system around an equipment center of gravity located substantially close to a floor of each platform gives the platform stability (e.g., as it moves around a curve).

Besides the systems described above, the present invention also envisions methods and programmed mediums (e.g., devices which store computer programs and/or code) adapted to control and carry out substantially the same features and functions.

The present invention and its advantages can be best understood with reference to the drawings, detailed description of the invention and claims that follow.

DETAILED DESCRIPTION OF THE INVENTION

Figure 1:
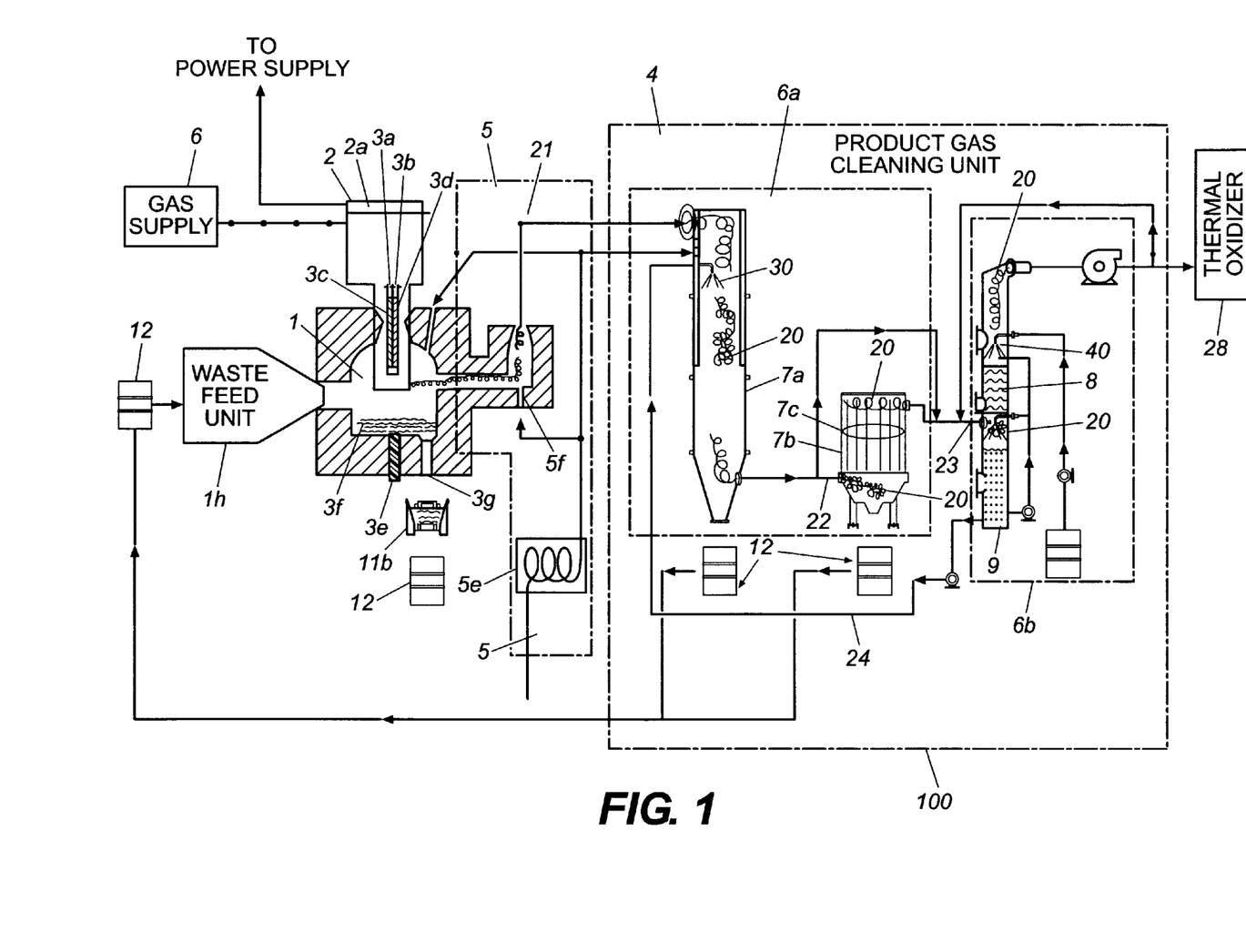
FIG. 1 depicts a simplified block diagram of a ruggedized and flexible pyrolytic-based, hazardous waste processing system (hereafter referred to as "pyrolytic system") according to one embodiment of the present invention.

Referring to FIG. 1, there is shown an example of a ruggedized and flexible pyrolytic system 100 for processing hazardous waste according to one embodiment of the present invention.

Some of the components shown in FIG. 1 are: survivable waste processing vessel or means 1; switchable control unit or means 2; product gas cleaning unit or means 4; and carbon conversion unit or means 5. It should be understood that the system 100 depicted in FIG. 1 does not show all of the novel features and functions of the present invention nor does it show all of the components of a commercial pyrolytic system. For example, FIG. 1 does not show the many novel ways in which hazardous or toxic waste (hereafter collectively referred to as "hazardous waste") can be fed into vessel 1. In addition, novel cooling units envisioned by the present invention are not shown. Instead, FIG. 1 depicts a simplified system in order to make the discussion which follows easier, it is hoped, to understand.

Figure 2:
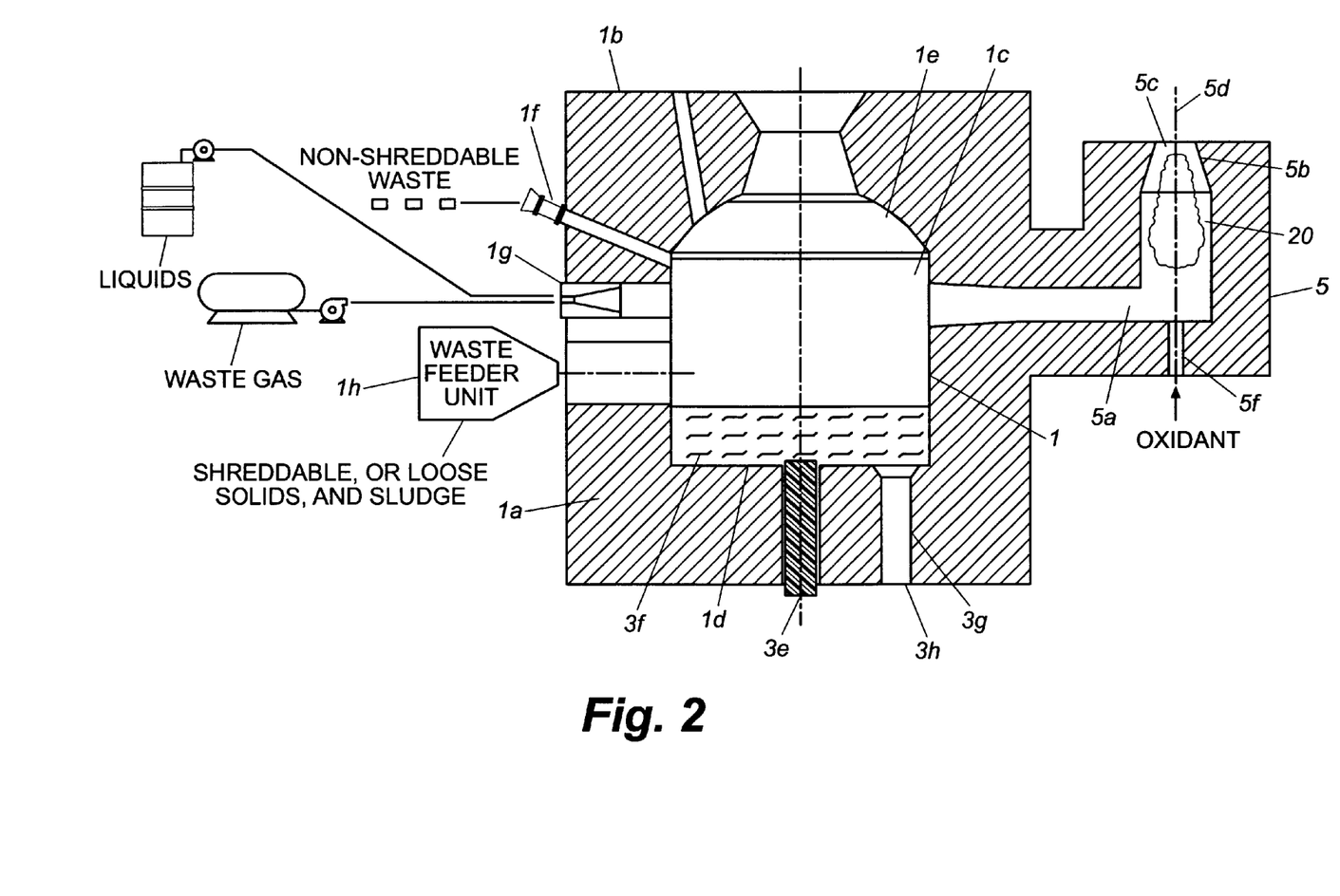
FIG. 2 depicts a simplified diagram of a survivable processing vessel and carbon conversion unit according to one embodiment of the present invention.

Referring first to FIG. 2, there is shown a simplified drawing of the survivable waste processing vessel 1.

Vessels, like vessel 1, envisioned by the present invention are adapted to survive vibrations and shock encountered when they are moved from one hazardous waste processing site to another (or moved from one place to another within the same site), and to survive other stresses as well. In one embodiment of the present invention, processing vessel 1 comprises an internal refractory lining 1a, itself comprising self-sealing castables (hereafter referred to as "castable refractory"). In an illustrative embodiment of the present invention, the castable refractory comprises a combination of high alumina, chrome, and insulating castables collectively referred to as "refractory materials"). The outer surface 1b of vessel 1 may comprise steel or the like.

One characteristic of these refractory materials is that they are "self-sealing". By self-sealing is meant that these materials, when fractured, are capable of sealing small cracks when heat is applied to them (e.g., when the system 100 begins operation after it has been shut down). Thus, the vessel 1 may be referred to as a self-sealing, refractory vessel. The use of self-sealing, refractory materials makes vessels envisioned by the present invention more rugged and survivable.

After extensive testing, the present inventors have concluded that, unlike vessels used in existing systems, vessels envisioned by the present invention are rugged enough to be moved from one waste site or position to another without sacrificing the structural integrity of the vessel. Self-sealing, refractory vessels are just one idea envisioned by the present invention. In addition, the present invention envisions vessels which comprise novel shapes to further increase their ruggedness, survivability and performance.

In one embodiment of the present invention, vessels envisioned by the present invention comprise shapes which are adapted to substantially minimize stresses. More specifically, the vessel 1 (see FIG. 2) comprises a cylindrical lower portion 1c, floor 1d, and a Roman-arch like upper portion 1e. The use of cylindrical and Roman-arch shapes disperses stresses. Existing vessels comprise shapes whose surfaces meet at perpendicular angles (e.g., comers). Instead of comers, vessels envisioned by the present invention comprise curved surfaces. Curved surfaces act to minimize stresses which are generated, for example, when the vessel 1 is moved. In addition, stresses generated by differential expansion of the vessel 1 when it is heated to extreme temperatures by plasma arc torches 3a,3b (see FIG. 1) are also minimized by such surfaces. The exact dimensions of vessel 1 depends upon the throughput (i.e., how much waste needs to be processed over a given time period) required. In general, the higher the throughput the larger the vessel.

Practically speaking, there is no reliable way to predict beforehand the type of hazardous waste a system might be called upon to process. Therefore, a system must be versatile and flexible enough to process more than one type of hazardous waste. Realizing this, the present inventors envision systems and vessels which are adapted to receive more than one type of hazardous waste.

Referring again to FIG. 2, vessel 1 may be adapted to receive non-shreddable wastes via non-shreddable pathway 1f. Examples of non-shreddable wastes are thermal batteries and small ammunition. More specifically, the non-shreddable pathway 1f may comprise a double-gated drop chute or the like adapted to feed non-shreddable solids into the vessel 1.

As can be seen in FIG. 2, vessels envisioned by the present invention may also be adapted to receive hazardous liquids and gaseous wastes, such as waste paints, solvents and waste oils, via pathway 1g. More specifically, the pathway 1g may comprise an injection unit (e.g., nozzle) adapted to feed liquid and/or gaseous waste into the vessel 1. In yet another embodiment of the present invention, the vessel 1 is adapted to receive shreddable, loose solids or sludge via waste feed unit 1h.

It should be understood that the present invention envisions vessels which are adapted to receive one or more forms of waste (i.e., solid, liquid or gas). Said another way, vessels envisioned by the present invention may comprise one or more of the pathways or devices 1f–1h depicted in FIG. 2 adapted to feed various forms of waste into the vessel 1.

It should also be understood that systems and vessels envisioned by the present invention may be adapted to simultaneously process one or more forms of hazardous waste fed to vessel 1 via one or more pathways 1f–1h provided other parameters of the system are maintained (e.g., an oxygen to product gas ratio).

As is explained in more detail in the co-pending application referenced above, if an improperly designed system attempts to process more than one type of hazardous waste, the results may be disastrous. For example, a waste processing system designed primarily to handle one type of waste (e.g. asbestos or contaminated soils) may generate dangerous levels of product gasses which may lead to explosions when used to process a different type of waste (e.g., PCBs or medical wastes). Also, a waste processing system designed to process only one type of waste may not be capable of processing a different type of waste and still meet environmental standards. That is, such a waste processing system may generate unacceptable levels of pollutants or byproducts during the processing of the second type of hazardous waste.

In sum, designing ruggedized waste processing systems which are flexible enough to safely process more than one type of hazardous waste is far from trivial.

One feature which makes pyrolytic systems envisioned by the present invention more flexible than existing systems is the presence of switchable control unit 2 (see FIG. 1) adapted to rapidly (i.e., in real-time as opposed to manually) control the switching of a gas fed from a gas supply unit 6 to torches 3a, 3b from air to an inert gas, such as nitrogen, or vice-versa, independently. The ability to rapidly switch the gas supplied to one or more plasma arc torches 3a, 3b independently helps give systems envisioned by the present invention the ability to safely process more than one type of hazardous waste.

Throughout the discussion above and below, reference will be made to "rapidly", "real-time" or "instantaneous" (or variations of these words) controls, switching or adjustments. It should be understood that these terms mean that actions are carried out quickly, most often by automatic control units and/or switches within a fraction of a second. Such control units and switches typically comprise, for example, a combination of electrical, electronic, electro-mechanical, mechanical and opto-electronic devices or the like which may themselves be controlled by computer programs, program code or the like.

To illustrate how switchable-control unit 2 enables system 100 to safely process more than one type of hazardous waste, consider the following simplified explanation.

After a first type or form of hazardous waste is fed into the vessel 1 via pathways 1f–1h, it is destroyed by the extreme temperatures generated by one or more plasma arc torches 3a, 3b. Initially, torches 3a, 3b are adapted to use air to generate a plasma arc. When some wastes are processed, huge volumes of hydrogen and carbon monoxide-rich gasses may be generated. In order to operate the system 100 safely, it is necessary to closely monitor the amounts of such gasses (commonly referred to as "product gasses") within the vessel 1 and entire system 100. More specifically, it is critical to maintain a ratio of oxygen to product gas of less than 3% by volume. In other words, it is critical to make sure that the volume of oxygen inside the vessel 1 and throughout the system 100 does not exceed a certain level when compared to the volume of product gas. It should be understood that the gasses making up the product gas will vary depending on the waste being processed. Thus, it is possible that when the first type of hazardous waste is destroyed the ratio of oxygen to product gas will remain safely below 3% but, when a second type of hazardous waste is destroyed, the ratio may quickly increase to levels which approach or exceed the safe 3% limit.

Realizing this, the present inventors envision providing ways to maintain the ratio of oxygen to product gas below 3% when different types of waste are being processed. One way of doing this is by supplying both torches 3a, 3b with an inert gas. Supplying an inert gas to the torches 3a, 3b helps reduce the volumetric percentage of oxygen within the vessel 1 and system 100.

In more detail, the present invention envisions one or more plasma arc torches 3a, 3b adapted to operate (i.e., generate a plasma arc) using either air or an inert gas, such as nitrogen. In one embodiment of the present invention, a system envisioned by the present invention comprises two torches 3a, 3b (referred to as a "dual" torch configuration).

To make use of a dual torch configuration the system 100 comprises vessel 1 adapted to receive torches 3a, 3b and switchable control unit 2 adapted to rapidly control the switching of a gas between air and an inert gas (e.g., from air to an inert gas or from an inert gas to air), from a gas supply 6 to one or more of the torches 3a, 3b independently. When an inert gas is supplied to one or both torches 3a, 3b, the torches are adapted to generate plasma arcs which in turn act to supply a sufficient amount of the inert gas to the vessel. Adding the inert gas to the vessel 1 reduces the percentage of oxygen within the vessel 1. When the ratio of oxygen to product gas begins to fall to an acceptable level the switchable unit 2 is adapted to rapidly control the switching of the gas to one or both torches 3a, 3b from the inert gas back to air. Thereafter, one or both torches 3a, 3b are adapted to generate plasma arcs using air. This process may be repeated each time the ratio begins to increase/decrease.

Though not necessary for an understanding of the present invention, it should be understood that switchable control unit 2 can be further adapted to supply a small amount of gas (e.g., air or an inert gas) to torches 3a or 3b to help cool the torches 3a, 3b even when they are not operating.

In an alternative embodiment of the present invention, the control unit 2 can be adapted to rapidly control power to each torch 3a, 3b independently so as to extend the life of an electrode 3c, 3d within each torch 3a, 3b.

During the operation of system 100, it may be necessary to vary the electric load of the torches 3a, 3b to, for example, increase the heat needed to process inorganic wastes fed into the vessel 1. After the inorganic waste is processed, the electric load can be decreased. This process of increasing and decreasing electric loads tends to decrease the life of electrodes within the torches 3a, 3b.

In more detail, each torch 3a, 3b typically comprises a plasma arc attachment to an electrode. The electrode will wear or erode at the point of attachment. For a given electrode, the point of attachment and the extent of wear is a function of the electrode and electric load (i.e., power level). Thus, varying the electric load in such a relatively uncontrolled manner causes the electrode to wear unevenly, reducing the life of the electrode.

In order to maximize the life of electrodes 3c, 3d and, therefore, torches 3a, 3b switchable unit 2 may be adapted to instantaneously and independently control the supply of a range of power to each torch 3a, 3b. By independently controlling the power to each torch 3a, 3b, the life of each electrode 3c, 3d is maximized. In an illustrative embodiment of the present invention, the power range for each torch is controlled within the range of 50% power to full power. It should be understood that torches 3a, 3b may be capable of operating over a wider range than 50% power to full power. Nonetheless, to preserve the electrodes 3c, 3d and torches 3a, 3b, the control unit 2 is adapted to control the power to torches 3a, 3b such that a wider range is not utilized.

Switching the type of gas supplied to torches 3a, 3b as discussed before is not the only feature which provides flexibility to systems envisioned by the present invention. The present invention also envisions embodiments where the system 100 may be adapted to process certain wastes (e.g., inorganic wastes) more efficiently using a torch whose electrode is separated into anode and cathode sections.

"Non-transfer" arc configurations are more efficient at processing organic wastes while "transfer" arc configurations are more efficient at processing inorganic wastes.

A non-transfer arc configuration is a plasma arc torch whose electrode comprises a combined anode and cathode. A transfer arc configuration is a plasma arc torch whose electrode comprises a separate anode and cathode.

FIG. 1 depicts examples of each. Torches 3a, 3b can be viewed as non-transfer arc torches whose electrodes 3c, 3d comprise a combined anode or cathode. Alternatively, one of the torches 3a or 3b can be viewed as being a transfer arc torch. For example, if torch 3b is considered a transfer arc torch, its electrode then comprises anode 3d and cathode 3e.

Said another way, torches 3a or 3b may be viewed as comprising non-transfer or transfer arc torches.

From FIGS. 1 and 2, it can be seen that the cathode 3e is substantially in contact with (e.g., submerged in) the molten material 3f. Because of this, the material 3f is heated to higher temperatures than can be generated in a non-transfer arc configuration.

In illustrative embodiments of the present invention, system 100 may comprise a combination of non-transfer arc torches and transfer arc torches for processing more than one type of hazardous waste. In addition, vessel 1 may be adapted to receive both types of torches. In an illustrative embodiment of the invention, vessel 1 may be adapted to receive the cathode section 3e of a transfer arc torch at the bottom of vessel 1.

Though the system 100 may comprise a combination of non-transfer and transfer arc torches, it should be understood that only one type of torch can be operating at any given moment. Said another way, if the system 100 comprises one transfer arc torch and one non-transfer arc torch, each may operate in sequence, but not at the same time. On the other hand, if both torches comprise non-transfer arc torches, both may operate at the same time.

Before introducing additional features aimed at making systems envisioned by the present invention more rugged or flexible, another feature of the present invention is worthy of note. This feature is aimed at making systems envisioned by the present invention more environmentally friendly when compared to existing methods and systems.

Hazardous waste processing methods and systems must adhere to federal state and local environmental emission requirements. In particular, most environmental standards require that byproducts emitted by hazardous waste processing systems contain as few hazardous elements as possible. For example, most emission standards require that the level of "particulate" in gasses or liquids cannot exceed levels set by federal, state and local regulations. A very high level of particulate which comprises carbon (hereafter referred to as "carbon particulate") is created when certain wastes are destroyed.

Though existing systems disclose means for removing carbon particulate from product gas, these means are not sufficient. The present inventors sought ways to substantially reduce the generation of carbon particulate.

In an illustrative embodiment of the present invention, systems envisioned by the present invention further comprise a carbon conversion unit 5 adapted to maximize the conversion of free carbon particulate within product gas 20 to carbon monoxide.

Referring back to FIG. 2 the carbon conversion unit 5 comprises a breech duct or means 5a which is adapted to increase the turbulence of the product gas 20 and entrained carbon particulate exiting from the vessel 1. More specifically, the breech duct 5a comprises an eductor portion or means 5b (hereafter "eductor") adapted to increase the turbulence of product gas 20. The eductor portion 5b comprises a narrow, venturi shaped pathway which terminates at an opening 5c (i.e., exit). As the gas 20 flows through the pathway 5b a drop in gas pressure occurs. This causes an increase in turbulence within the gas 20 as it begins to spiral violently around a central axis 5d. The spiraling and turbulence encourages carbon particulate within gas 20 to react with an oxidant to form carbon monoxide, significantly increasing the efficiency of the conversion of particulate into carbon monoxide. In contrast, existing systems use passive baffles. In such systems gas is forced to pass through a maze of stationary, refractory baffles. Making the gas change direction through the baffles creates some turbulence. However, baffles only introduce a minimum amount of turbulence. In contrast, eductors envisioned by the present invention introduce significant amounts of turbulence into the gas 20.

At the same time as the eductor 5b is generating turbulence, an oxidant injector or means 5e (see FIG. 1) is adapted to inject an oxidant into the extremely turbulent gas 20. In an illustrative embodiment of the present invention, unit 5 is adapted to receive the oxidant via pathway 5f from injector 5e. In an illustrative embodiment of the present invention, the oxidant comprises steam. As the oxidant is injected into the highly turbulent gas, it is thoroughly mixed with the gas 20 containing the carbon particulate. A maximum amount of free carbon particulate can be removed from the product gas 20 by injecting the oxidant substantially along the axis 5d of the breech duct 5a. In an illustrative embodiment of the present invention, the oxidant injector 5e is adapted to inject the oxidant along this axis 5d. Besides creating turbulence, the eductor 5b also forces the gas 20 to remain within unit 5 longer (i.e., the "residence time" is increased) because it cannot escape through the narrow opening 5c fast enough. The longer the gas 20 remains within the unit 5, the higher the amount of particulate removed from the gas 20.

The eductor 5b acts like a high speed mixing bowl, creating a way for the product gas 20 to thoroughly mix with the oxidant which, in turn, encourages the formation of bonds between carbon and oxygen.

It should be noted that the carbon conversion unit 5 also comprises the refractory materials mentioned before and is typically cast (i.e., made) at substantially the same time as the vessel 1.

Earlier it was noted that it is difficult to predict the type of hazardous waste which a system may be called upon to process. As difficult as that is, it is also difficult to predict whether or not a given hazardous waste site will have the necessary utilities, such as water and power, to support a waste processing system. Water is used to cool parts of the system 100, to cool gas within the system 100 and to help remove unwanted byproducts (e.g., pollutants and carcinogens) from product gas created when hazardous waste is destroyed.

In an illustrative embodiment of the present invention, systems envisioned by the present invention may further comprise a product gas cleaning unit 4 (see FIG. 1) adapted to reuse and recirculate water instead of discharging water and a cooling unit or means 10 (see FIG. 3) adapted to cool the recirculated water. Recirculating and reusing water has two advantages. First, substantially less water is needed in the system, and second, a "waste water slip stream" (e.g., discharge) is substantially eliminated. As will be explained shortly, units 4 and 10 greatly reduce the system's 100 reliance on an external source of water, making it possible to use system 100 at sites which have little or no water. This makes the system 100 extremely flexible. The advantages provided by cleaning unit 4 will be discussed first.

In one embodiment of the present invention, the cleaning unit 4 comprises a combination of dry scrubber or means 6a and wet scrubber or means 6b.

Referring back to FIG. 1, product gas 20 flows from the vessel 1 into the carbon conversion unit 5. Upon exiting the carbon conversion unit 5, product gas 20 enters the dry scrubber 6a via a transition duct 21. Typically, the product gas 20 comprises fine particles referred to above as particulate. One of the functions of the product gas cleaning unit 4 is to capture particulate entrained in (i.e., present within) the product gas 20 which comprises carbon and other undesirable "heavy" metals, such as chromium or lead.

In more detail the dry scrubber 6a comprises an evaporative cooling unit or means 7a and a filtering unit or means 7b. Upon first entering the dry scrubber 6a, the product gas 20 is sprayed with a fine mist 30 or the like from the evaporative cooling unit 7a This mist 30 significantly reduces the temperature of the product gas 20. In an illustrative embodiment of the present invention, downstream from the evaporative cooling unit 7a is a filtering unit 7b. Upon entering the filtering unit 7b via a pathway 22, the product gas 20 is drawn through layers of a filtering media 7c or the like. In an alternative embodiment of the present invention, the layers of media 7c may comprise ceramic, glass, wool or other media. The filtering unit 7b can be analogized to an air filter. Product gas leaving the evaporative cooler 7a is drawn through this filter 7b made up of multiple layers of a filtering media 7c.

Upon exiting the dry scrubber 6a, the product gas 20 contains a significantly reduced amount of particulate. Thereafter, the gas 20 enters the wet scrubber 6b via a pathway 23 in order to further reduce the amount of particulate within product gas 20. In an illustrative embodiment of the present invention, the wet scrubber 6b may comprise polishing unit or means. The polishing unit in turn comprises a packed bed section 8. Upon entering the polishing unit, the product gas 20 is drawn through the packed bed 8 which is adapted to be packed with a chemically resistant material such as a plastic. The packed bed 8 may comprise the shape of ceramic rings or other geometric shapes. In an illustrative embodiment of the invention water and a caustic solution 40 are sprayed upon the bed 8.

The solution 40 flows through the packed bed 8 in the opposite direction as gas 20. The bed 8 is adapted to remove any remaining particulate within the gas 20. In an illustrative embodiment of the invention, some of the solution 40 which is sprayed onto the bed 8 is collected at a bottom 9 of the wet scrubber 6b.

In existing waste processing systems, the water which is collected at the bottom of a wet scrubber is chemically cleaned. Periodically the cleaned water is discharged and replaced with new water. The water that is discharged is commonly referred to as a waste water slipstream because it appears as a stream of water containing fine particles of waste, heavy metals and/or neutralized salts.

In contrast, systems envisioned by the present invention substantially eliminate such a slipstream by sending the water collected at the bottom 9 of the scrubber 6b back to the evaporative cooler 7a via pathway 24 (i.e., recirculating the water). This allows the water to be reused in cooling and allows particulate still remaining in the product gas 20 to be removed. As a result, the amount of water required to operate systems envisioned by the present invention is substantially reduced, making it possible to operate such systems at locations which do not have a supply of water readily available.

Particulate which has been removed from the gas 20 is not discharged but is sent back to the feed unit to be processed again. For example, when each bin 12 (e.g., barrel) is full of particulate, the particulate is fed into vessel 1 to be further processed by the system 100.

Figure 3:
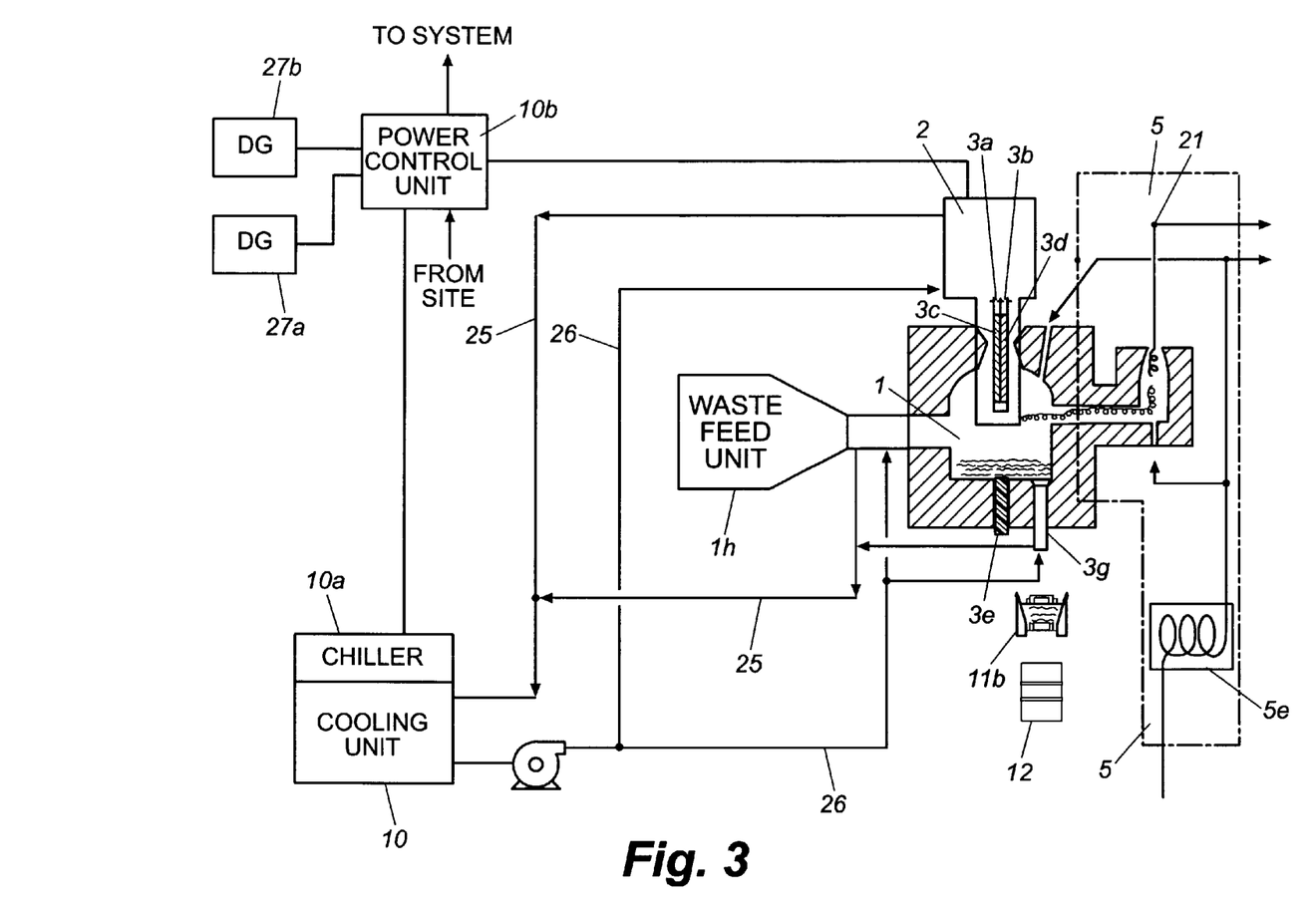
FIG. 3 depicts a simplified diagram of a method of cooling a hazardous waste processing system according to one embodiment of the present invention.

Part of the discussion just ended was directed at conserving water during a cleaning process. The present inventors envision conserving water during a cooling process as well. Referring to FIG. 3 there is shown a cooling unit 10 adapted to cool parts of the system 100, including the torches 3a, 3b, waste feed unit 1h and tapping conduit 3g to name just a few.

In existing systems, cooling units comprise cooling towers which are full of water. Such systems assume that hazardous waste sites will have a ready source of water which can be continuously pumped into the cooling tower to replace water that has evaporated. As discussed above, the present invention does not make such an assumption. To the contrary, the present invention assumes that there will not be a ready source of water to cool parts of the system 100.

In an illustrative embodiment of the present invention, the cooling unit 10 comprises a refrigerator or refrigerating means 10a (hereafter referred to as "chiller"). The chiller 10a is adapted to cool recirculated water via pathways 25 using a refrigerant. The cooled recirculated water is then sent to those parts of the system 100 which need to be cooled via pathways 26. In this way, instead of using a cooling tower and a ready source of water to cool parts of the system 100, the present invention envisions using the chiller 10a without a ready supply of water to accomplish the same thing. Such a system may be referred to as a "closed-loop" cooling system because substantially no water is added or deleted from the system 100 to cool it.

Just as there is no guarantee that a ready source of water will be available at a hazardous waste site, so too there is no guarantee that a source of power will be available. To make sure adequate power is available, the present invention envisions a system 100 which comprises redundant, diesel generators 27a and 27b (see FIG. 3). Under normal operating conditions one generator is dedicated to supplying power to plasma arc torches 3a, 3b, while the other is dedicated to supplying power to the rest of the system 100. Each diesel may be comparable in output power. In an additional embodiment of the present invention, the power output from each diesel is routed through a power control unit or means 10b (e.g., panel) which is adapted to control the distribution of the power to the system 100, including the torches 3a, 3b and chiller 10a.

Power is routed through the control panel 10b for the following reason. If one of the diesels 27a, 27b should fail it would be necessary to shut down the torches 3a, 3b in order to continue to supply power to the system 100 in order to initiate an emergency shut down procedure and to operate the chiller 10a. To that end, the control panel 10b is adapted to distribute power from a working generator to the chiller 10a in the event the other generator should fail.

In an alternative embodiment of the present invention, the control panel 10b can be adapted to distribute power available from the site.

The ability to use minimal amounts of water is only one aspect of the system 100 which makes it more flexible than existing systems. Another feature of the present invention which provides flexibility is the use of one fuel to power the generators 27a, 27b and a thermal oxidizer 28. In an illustrative embodiment of the present invention, each generator 27a, 27b and the oxidizer 28 is adapted to use a single diesel fuel as its energy source. The use of a single fuel eliminates the need to rely on multiple fuel sources (e.g., natural gas, propane, diesel), some of which may not be available at a given site.

The use of diesel fuel as a fuel source for the thermal oxidizer 28 is a departure from existing systems. Typically, existing systems use natural gas to maintain a pilot light within the thermal oxidizer. Existing systems also assume that hazardous waste sites will have a ready source of natural gas. The present inventors do not make this assumption. Instead, the present inventors assume that a ready source of natural gas may not be present at the site. Because of this, the present invention envisions an oxidizer 28 adapted to run on diesel fuel instead of natural gas. In sum, both the oxidizer 28 and generators 27a, 27b are adapted to run on a single diesel fuel.

In addition to the features and functions set forth above, the present invention envisions methods and systems for processing molten liquids which are created when hazardous waste is destroyed. More particularly, after an amount of waste is processed it becomes necessary to remove molten material 3f (see FIG. 2) which flows to the bottom of the vessel 1. This material 3f must be removed when the amount of material rises to a specific level. In existing systems, the molten material (which is sometimes referred to as "slag") exits through a refractory lined conduit. At the end of the conduit is a water-cooled plug. To remove the slag the plug is removed. When the plug is put back into place, a layer of molten material remains within the refractory lined conduit. This molten material becomes hard over time. Subsequently, when the plug is again removed the hardened material remains, blocking the flow of molten material through the conduit.

To alleviate this problem, systems envisioned by the present invention comprise a heated tapping conduit 3g. This heated tapping conduit 3g is adapted to heat the molten material present within the conduit to a sufficient viscosity. This keeps the material in a molten state and prevents it from hardening. When a plug 3h is removed or opened, the molten material can flow freely.

Figure 4:
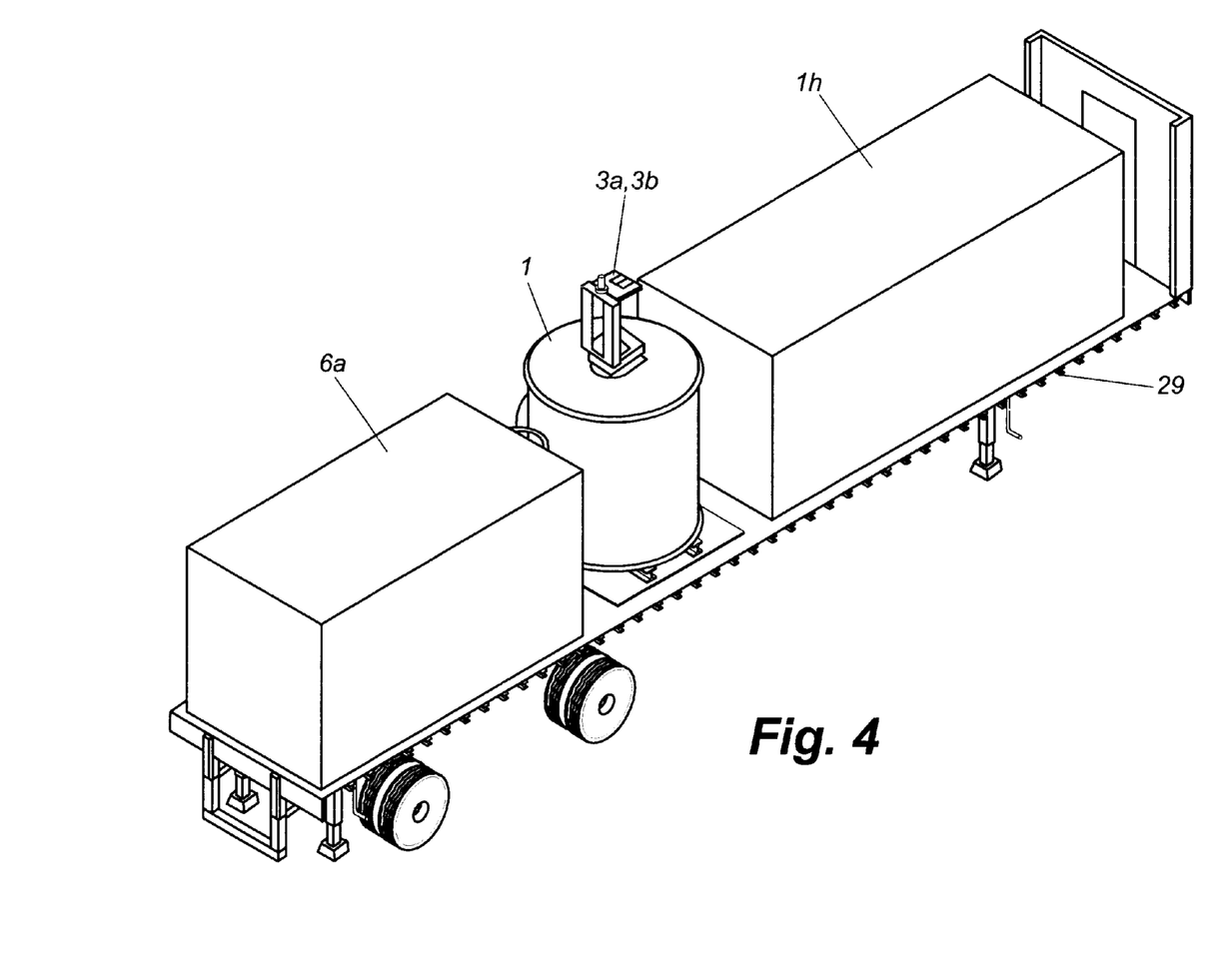
FIG. 4 depicts a simplified diagram of a ruggedized platform according to one embodiment of the present invention.

The present invention also envisions ways to move a waste system from one location to another. In an illustrative embodiment of the present invention, systems envisioned by the present invention are placed on, or attached to, one or more ruggedized platforms 29 (see an example of one in FIG. 4), each of which is adapted to minimize road shock and vibration to the system 100. To minimize shock and vibration, each platform 29 comprises a unibody construction and an air ride suspension. Each platform 29 may comprise one or more flat-bed trailers or the like. The flat-bed trailer or platform 29 may be attached to a motorized vehicle (not shown in FIG. 4) in order to move components of a system from one location, or position, to another. In order to minimize both road shock and vibration, components are positioned on platform 29 such that the weight on platform 29 stays within legal limits and has an equipment center of gravity which is substantially close to a floor of the platform 29.

It should be understood that the features and functions described above may be used in both mobile and fixed waste processing systems envisioned by the present invention, though, short-term, the tendency may be to use them in mobile systems more than fixed systems.

The above discussion focuses on ruggedized and flexible systems for processing hazardous waste. It should be understood that the present invention also envisions methods and programmed mediums 2a (e.g., devices adapted to store computer programs or code, such as floppy disks, hard drives, CDs, electronic memories and the like which may be adapted to be used with control units, such as switchable control unit 2, or the like) adapted to control and carry out the features and functions described above.

It is to be understood that changes and variations may be made to the disclosure above without departing from the scope or spirit of the present invention as defined by the claims that follow.

We claim:

1. A hazardous waste processing system ruggedized for survivability comprising:
    a hazardous waste processing vessel built to minimize stress and including at least one plasma arc torch that generates extreme temperatures for pyrolyzing hazardous waste and converting the pyrolyzed hazardous waste to a product gas;

at least one pathway for feeding the hazardous waste into the hazardous waste processing vessel;

a power control unit that supplies electrical power to the plasma arc torch;

a carbon conversion unit for converting carbon particulate in the product gas to carbon monoxide, the carbon conversion unit comprising a breech duct including an eductor with a venturi-shaped pathway that increases the turbulence of the product gas as the product gas exits from the hazardous waste processing vessel;

an oxidant injector for injecting oxidant into the carbon conversion unit to react with the carbon particulate in the turbulent product gas to form carbon monoxide; and a product gas cleaning unit that receives the product gas from the carbon conversion unit and cools and cleans the product gas.

2. The hazardous waste processing system of claim 1 wherein the power control unit supplies power to the plasma arc torch independently over a power range of fifty percent power to full power.

3. The hazardous waste processing system of claim 1 further comprising a gas supply control unit that selectively supplies air and inert gas to the plasma arc torch to operate the plasma arc torch, and wherein the gas supply control unit controls rapid switching of the gas supply to the plasma arc torch between air and an inert gas to keep a percentage of oxygen within the hazardous waste processing vessel below an acceptable level.

4. The hazardous waste processing system of claim 3 wherein the inert gas comprises nitrogen.

5. The hazardous waste processing system of claim 1 wherein the waste processing vessel is adapted to accommodate both a transfer arc configuration and a non-transfer arc configuration.

6. The hazardous waste processing system of claim 1 wherein the waste processing vessel is adapted to receive a cathode of a transfer arc torch.

7. The hazardous waste processing system of claim 1 wherein the hazardous waste processing vessel includes a self-sealing refractory lining.

8. The hazardous waste processing system of claim 7 wherein the self-sealing refractory lining comprises a combination of alumina, chrome and insulating castables.

9. The hazardous waste processing system of claim 1 further comprising a thermal oxidizer that receives the product gas from the product gas cleaning unit and burns off the product gas generated within the waste processing vessel.

10. The hazardous waste processing system of claim 9 wherein the thermal oxidizer is adapted to operate using diesel fuel.

11. The hazardous waste processing system of claim 9 further comprising a diesel generator for supplying electrical power to the thermal oxidizer.

12. The hazardous waste processing system of claim 1 wherein the system is mobile and can be transported to a plurality of waste processing sites.

13. The hazardous waste processing system of claim 1 wherein the hazardous waste processing vessel is shaped to minimize stress.

14. The hazardous waste processing system of claim 1 further comprising a transport platform adapted to minimize road shock and vibrations when the waste processing system is transported from one waste processing site to another waste processing site.

15. The hazardous waste processing system of claim 1 further comprising a hazardous waste feeder unit for feeding shreddable solids and sludge to the hazardous waste processing vessel; and wherein the at least one pathway is used for feeding non-shreddable solids into the hazardous waste processing vessel.

16. The hazardous waste processing system of claim 15 further comprising a refrigeration unit that supplies recirculated cooling water to the at least one plasma arc torch and the waste feeder unit.

17. The hazardous waste processing system of claim 1 wherein the at least one pathway is used for feeding liquids and gaseous hazardous waste into the hazardous waste processing vessel.

18. The hazardous waste processing system of claim 1 further comprising a plurality of pathways for simultaneously pyrolyzing more than one type of hazardous waste.

19. The hazardous waste processing system of claim 1 wherein the product gas cleaning unit comprises:

a dry scrubber including an evaporative cooler that sprays a water mist to lower the temperature of the product gas and a filtering unit for cleaning the product gas; and a wet scrubber including a bed packed with a chemically resistant material, wherein water and a caustic solution are sprayed onto the bed, and wherein the water collected at the bottom of the wet scrubber is recirculated to the evaporative cooler.

20. The hazardous waste processing system of claim 19 wherein the product gas cleaning unit is adapted to substantially eliminate a waste water slipstream.

21. The hazardous waste processing system of claim 19 wherein the product gas cleaning unit is adapted to substantially reduce an amount of water required for operation of the hazardous waste processing system.

22. The hazardous waste system of claim 1 wherein the waste processing vessel further includes a heated tapping conduit for removing molten material generated by processing hazardous waste, wherein the heated tapping conduit is adapted to melt the material within the conduit to a sufficient viscosity to prevent the material from hardening in the conduit.

23. The hazardous waste processing system of claim 22 further comprising a refrigeration unit that cools and supplies recirculated cooling water to the at least one plasma arc torch and the tapping conduit.

24. The hazardous waste processing system of claim 1 wherein the oxidant injector injects the oxidant along the central axis of the breech duct.

25. The hazardous waste processing system of claim 1 further comprising a diesel generator for supplying electrical power to the at least one plasma arc torch.

26. The hazardous waste processing system of claim 1 further comprising a plurality of diesel generators for supplying electrical power to the at least one plasma arc torch, a thermal oxidizer and a refrigeration unit.

27. The hazardous waste processing system of claim 26 wherein if a first diesel generator supplying electrical power to the thermal oxidizer and refrigeration unit fails, a diesel generator power control unit shuts off the electrical power supplied to the plasma arc torch by a second diesel generator and redirects the second diesel generator to supply electrical power to the thermal oxidizer and refrigeration unit.

28. The hazardous waste processing system of claim 1 wherein each torch is configured as a transfer arc torch.

29. The hazardous waste processing system of claim 1 wherein each torch is configured as a non-transfer arc torch.

30. The hazardous waste processing system of claim 1 further comprising a plurality of torches including at least one transfer arc torch for processing an inorganic hazardous waste and at least one non-transfer arc torch for processing an organic hazardous waste.

* * * * *